(12) United States Patent
Rieder

(10) Patent No.: US 11,633,637 B2
(45) Date of Patent: Apr. 25, 2023

(54) FLUID-JET EMITTING MACHINE

(71) Applicant: TECHNOALPIN HOLDING S.P.A., Bolzano (IT)

(72) Inventor: Walter Rieder, Bolzano (IT)

(73) Assignee: TECHNOALPIN HOLDING S.P.A., Bolzano (IT)

( * ) Notice: Subject to any disclaimer, the term of this patent is extended or adjusted under 35 U.S.C. 154(b) by 466 days.

(21) Appl. No.: 16/643,115

(22) PCT Filed: Sep. 4, 2017

(86) PCT No.: PCT/IB2017/055310
§ 371 (c)(1),
(2) Date: Feb. 28, 2020

(87) PCT Pub. No.: WO2019/043441
PCT Pub. Date: Mar. 7, 2019

(65) Prior Publication Data
US 2020/0391060 A1   Dec. 17, 2020

(51) Int. Cl.
*A62C 27/00* (2006.01)
*B60F 1/00* (2006.01)
(Continued)

(52) U.S. Cl.
CPC .............. *A62C 27/00* (2013.01); *B60F 1/005* (2013.01); *B60F 1/043* (2013.01); *B61D 15/00* (2013.01); *B60F 2301/00* (2013.01)

(58) Field of Classification Search
CPC ......... A62C 27/00; A62C 31/00; A62C 31/02; A62C 31/03; A62C 31/05; B60F 1/00;
(Continued)

(56) References Cited

U.S. PATENT DOCUMENTS 2,344,764 A * 3/1944 Younie ................. B61D 15/00
105/72.2
3,392,681 A * 7/1968 Bryan, Jr. ............. B61C 11/02
105/72.2
(Continued)

FOREIGN PATENT DOCUMENTS

CA         2241511       12/1998
CN        103935285     11/2015
(Continued)

*Primary Examiner* — Zachary L Kuhfuss
*Assistant Examiner* — Cheng Lin
(74) *Attorney, Agent, or Firm* — Workman Nydegger

(57) ABSTRACT

A fluid-jet emitting machine, particularly a firefighting machine, comprises a fluid-jet emitting device, a transport vehicle, lifting members and a control device.
Each lifting member comprises an actuator constrained to the transport vehicle and at least one idler wheel adapted to engage a rail of a track.
The actuators are configured to move the respective wheels between a non-operative position, in which the wheels are distanced from the respective rail, and an operative position, in which the wheels are arranged in contact with the respective rail.
The control device is operatively associated with the actuators to activate the passage of the wheels from the non-operative position to the operative position so that during movement along a track and in said operative position, the wheels prove to be pressed against the respective rail, exerting a force such as to reduce only part of the pressure exerted by the movement means of the vehicle on the track.

16 Claims, 3 Drawing Sheets

(51) Int. Cl.
*B60F 1/04* (2006.01)
*B61D 15/00* (2006.01)

(58) Field of Classification Search
CPC .. B60F 1/005; B60F 1/04; B60F 1/043; B60F 2301/00; B60F 2301/12; B60F 2301/04; B61D 15/00
See application file for complete search history.

(56) References Cited

U.S. PATENT DOCUMENTS

| | | | |
|---|---|---|---|
| 10,234,187 B2 * | 3/2019 | Rieder | B05B 7/0075 |
| 11,105,548 B2 * | 8/2021 | Rieder | B05B 7/0892 |
| 2004/0123768 A1 * | 7/2004 | Marcotte | E02F 9/022 |
| | | | 105/215.1 |
| 2019/0359020 A1 * | 11/2019 | Krols | B61J 3/12 |

FOREIGN PATENT DOCUMENTS

| | | | | |
|---|---|---|---|---|
| EP | 0887243 | | 12/1998 | |
| EP | 0887243 A2 * | | 12/1998 | B61D 15/00 |
| EP | 2815854 | | 12/2014 | |
| GB | 2324777 | | 11/1998 | |
| GB | 2453754 | | 4/2009 | |
| KR | 20160063007 A * | | 6/2016 | B61F 1/00 |
| RU | 2580779 C2 * | | 4/2016 | A62C 27/00 |

* cited by examiner

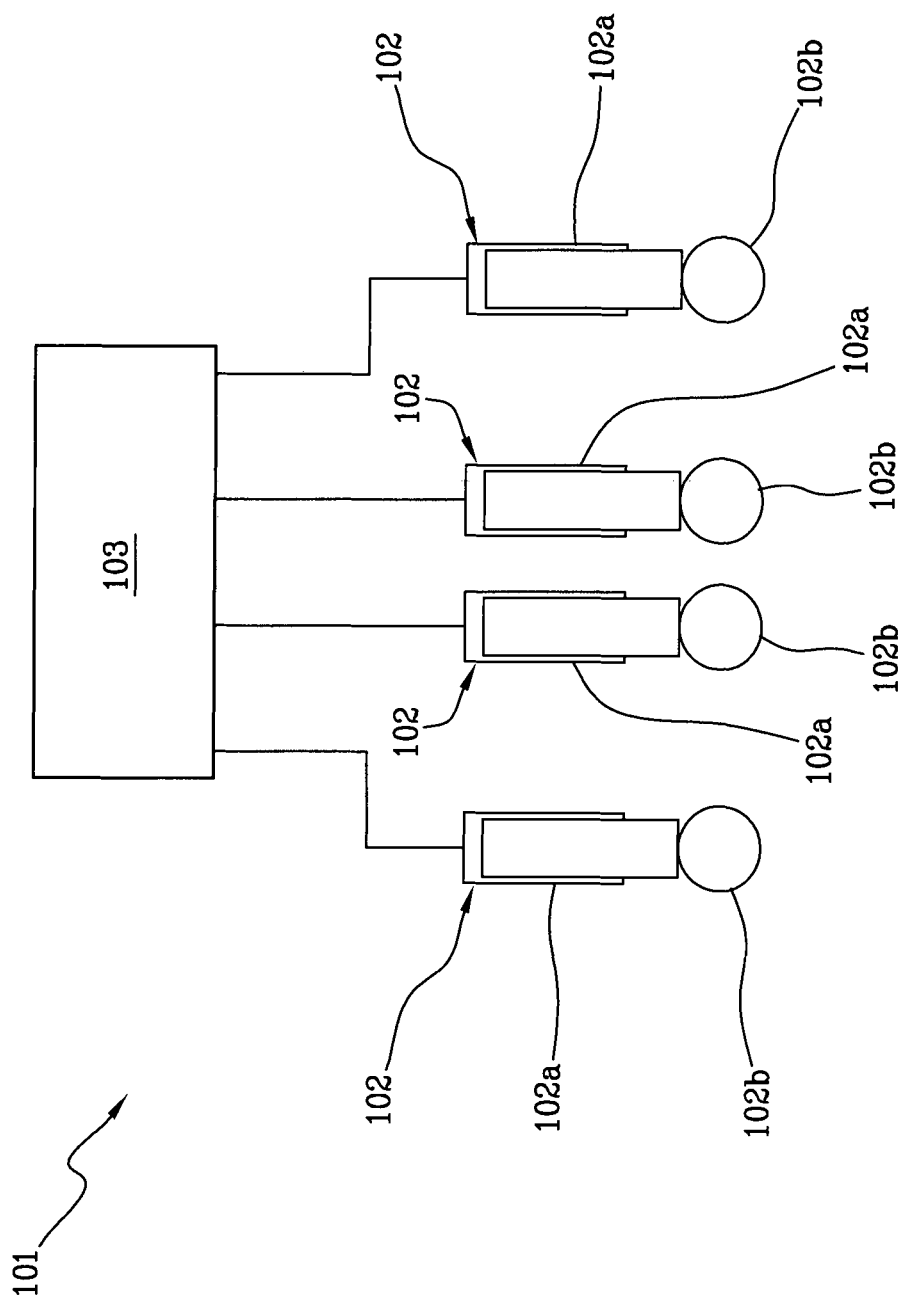

FLUID-JET EMITTING MACHINE

The present invention relates to a fluid-jet emitting machine, particularly a firefighting machine.

In particular, the present invention is intended for the movement of firefighting machines such as those employing fluid-jet emitting devices and that are in the form of "water cannons", that is, comprising a tubular body in which an impeller is inserted and in which nozzles are inserted for emission of the fluid for firefighting use (usually water) or for dust abatement or odour abatement, towards the air flow so as to create a jet comprising air and a liquid.

In firefighting operations in tunnels and underground transportation systems, shafts pose a series of issues for conventional firefighting systems. In fact, the enormous amount of smoke and soot that develops strongly undermines firefighting procedures.

All of this, combined with the high heat and reduced concentration of oxygen, makes human intervention extremely dangerous.

To overcome this problem, there are known self-propelled firefighting machines that are mounted on specific vehicles and which are capable of being controlled remotely so as to enable operations and fire-extinguishing even under conditions in which human intervention is impossible or particularly dangerous.

However, poor visibility, the often rugged terrain and the possible presence of rails make the movement of these devices extremely complicated, with the additional risk of damaging them, making them unusable and thus undermining the success of the operations.

The possibility of mounting such machines on railway carriages that then move along the railway route so as to bring the machine to the site of the fire is known, as shown for example in patent EP 1391364.

However, this solution also proves to be limited in terms of manageability and its complexity is intrinsic due to the need to provide for movement of the carriage and the setting-up of a complex structure comprising many cumbersome pieces.

In this context, the technical task underlying the present invention is to offer a fluid-jet emitting machine, particularly a firefighting machine, that overcomes at least some of the drawbacks of the prior art cited hereinabove.

In particular, an aim of the present invention is to make available a fluid-jet emitting machine, particularly a firefighting machine that is capable of moving along rails rapidly and safely without requiring complex structural procedures on it.

The defined technical task and the specified aims are substantially achieved by a fluid-jet emitting machine, particularly a firefighting machine having the technical characteristics stated in one or more of the appended claims.

In accordance with the present invention, a fluid-jet emitting machine, is shown, particularly a firefighting machine, which comprises a fluid-jet emitting device comprising at least one of the following: an odour abatement solution, a dust abatement solution, a flame mitigation solution, a transport vehicle, lifting members and a control device.

The transport vehicle comprises movement means, preferably tired, that can be arranged to rest on rails of a track and a support frame on which the fluid-jet emitting device is mounted.

Each lifting member comprises an actuator constrained to the transport vehicle and at least one idler wheel adapted to engage a rail of a track.

The actuators are configured to move the respective wheels between a non-operative position, in which the wheels are distanced from the respective rail, and an operative position, in which the wheels are arranged in contact with the respective rail.

The control device is operatively associated with the actuators to activate the passage of the wheels from the non-operative position to the operative position so that during movement along a track and in said operative position, the wheels prove to be pressed against the respective rail, exerting a force such as to reduce only part of the pressure exerted by the movement means of the vehicle on the track, so as to enable the movement means to have a residual tractive force on the track.

In the operative position, the wheels perform a function of guiding the trajectory of the machine on the track.

Further characteristics and advantages of the present invention will become more apparent from the approximate and thus non-limiting description of a preferred, but not exclusive, embodiment of a fluid-jet emitting machine, particularly a firefighting machine, as illustrated in the accompanying drawings, of which:

FIG. 3 is a schematic view of a road/rail conversion kit for vehicles according to the present invention.

Figure 1:
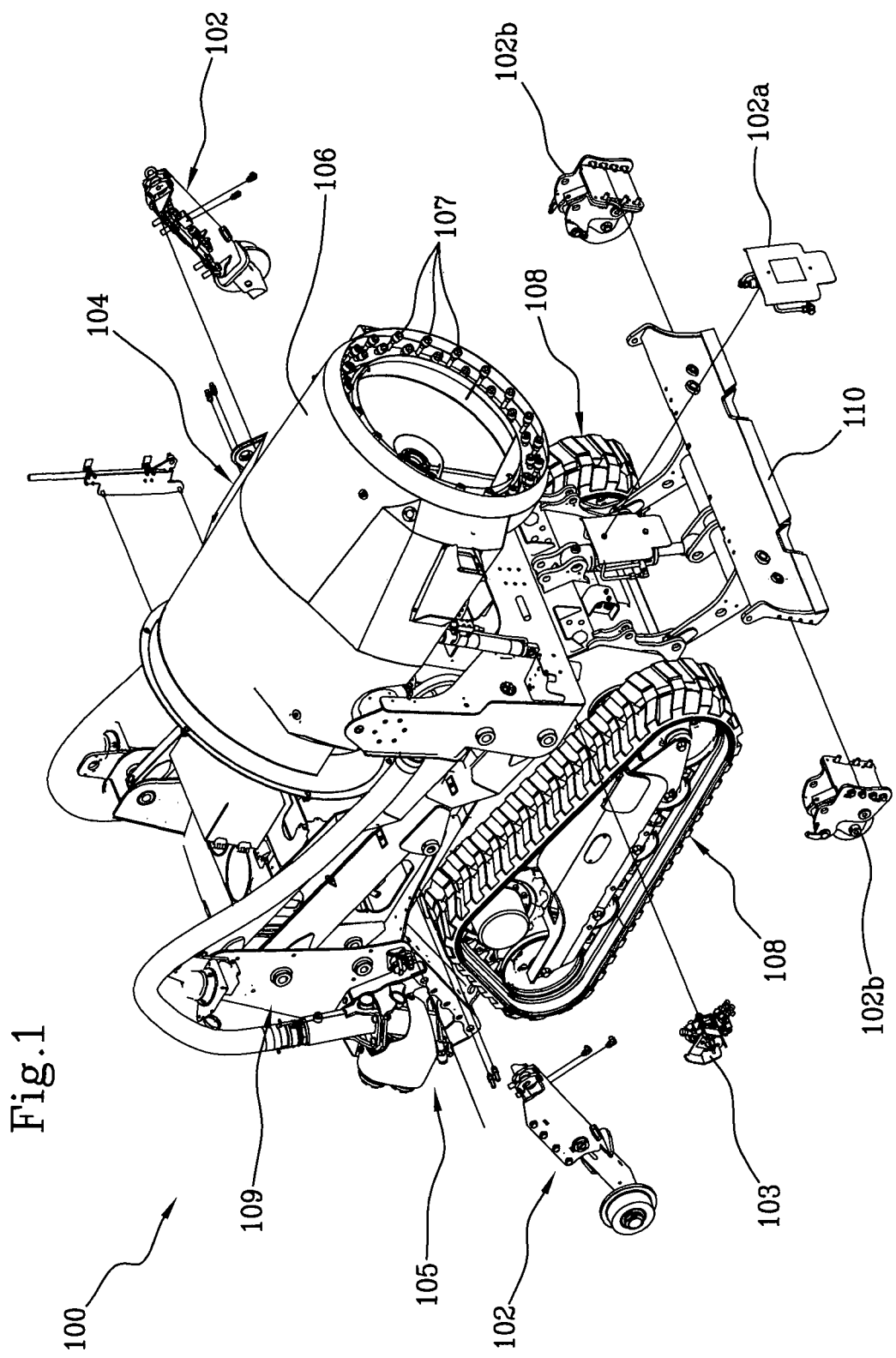
FIG. 1 is a view of a fluid-jet emitting machine with an exploded view of several components thereof.

A fluid-jet emitting machine is indicated by the number 100 in FIGS. 1 and 2 and herein below it is indicated as a firefighting machine 100 by way of non-limiting example.

In particular, the firefighting machine 100 comprises a fluid-jet emitting device 104, a transport vehicle 105, lifting members 102 and a control device 103.

The fluid-jet emitting device 104 comprises a tubular body 106 that extends between an air inlet mouth thereof and an air outlet mouth thereof, blowing means operatively associated with the tubular body to generate a flow of air along a direction of propagation of the air from the inlet mouth to the outlet mouth, and a plurality of nozzles 107 operatively associated with the tubular body 106 to spray a fluid towards the flow of air.

For example, the fluid utilized can consist of at least one of the following:

an odour abatement solution or a dust abatement solution or a flame mitigation solution.

The transport vehicle 105 comprises movement means 108, preferably tired movement means 108, and a support frame 109 on which the fluid-jet emitting device 104 is mounted.

These movement means 108 can consist of caterpillar tracks or wheels for example.

Moreover, the transport vehicle 106 can comprise a control unit that is externally accessible to a "walk-behind" operator or a radio control for remotely controlling the transport vehicle 105.

Each lifting member 102 comprises an actuator 102*a* reversibly constrained to the transport vehicle 105 and at least one idler wheel 102*b* adapted to engage a rail of a track.

The actuators 102*a* are configured to move the respective wheels 102*b* between a non-operative position in which the wheels 102*b* do not exert a force against the track and an operative position in which the wheels 102*b* exert a force against the track that is such as to partially reduce the pressure exerted by the movement means of the transport vehicle 105 on the track, transferring this pressure on the wheels 102*b*, and preferably there is obtained a reduction in the pressure exerted ranging between 40% and 50%, preferably a 45% reduction for example, 2000 Kg of the machine's total of 3700 Kg remain on the rail wheels).

In other words, in the operative position, the wheels 102b are thrust, by the actuators 102a, against the respective rail, thereby exerting a force against the rails which brings about partial lifting of the transport vehicle 105.

The partial lifting generates a transfer of the pressure, which the movement means 108 exert on the tracks, to the wheels 102b, resulting in an increase in their adherence to the railway line, thereby reducing the risk of the transport vehicle 105 moving off the line during movement of the firefighting machine 100.

However, this lifting movement is only partial, in that the contact of the movement means 108 with the rails needs to be guaranteed at all times, so as to ensure that the latter are capable of providing for movement of the firefighting machine 100.

The control device 103 is operatively associated with the actuators 102a to activate the passage of the wheels 102b from the non-operative position to the operative position in such a manner that during movement on the track, the wheels 102b perform a function of guiding the trajectory, whereas the movement means perform a function of moving the vehicle. Obviously, to enable its movement along the railway line without having to use auxiliary tractive means external to the tractive means of the transport vehicle 106 of the firefighting machine 100, the wheelbase of the movement means 108 must be of a length compatible with that of the track gauge of a rail on which the firefighting machine 100 needs to be moved. The track gauge is defined as the spacing between inner edges of the heads of the two rails of a track, measured at 14 mm below the running surface; preferably reference is made to a track gauge equal to 1435 millimetres. In any case, it should be noted that the present invention is adaptable to any other track gauge value.

The wheelbase of the movement means 108 is instead defined as the distance between the centre planes of the movement means 108 arranged on opposite sides of the transport vehicle 105.

In other words, the movement means 108 have a wheelbase that is compatible with a track gauge and preferably the movement means 108 have respective footprints arranged at a distance such as to be arranged simultaneously in contact on respective rails of a track.

In particular, the difference between the track gauge length and the wheelbase of the movement means 108 is greater than 0 cm and less than two times the lateral dimension of a single movement means 108 of the transport vehicle 105; in this manner, it is always ensured that the movement means 108 are always all simultaneously in contact with the rails.

Figure 2:
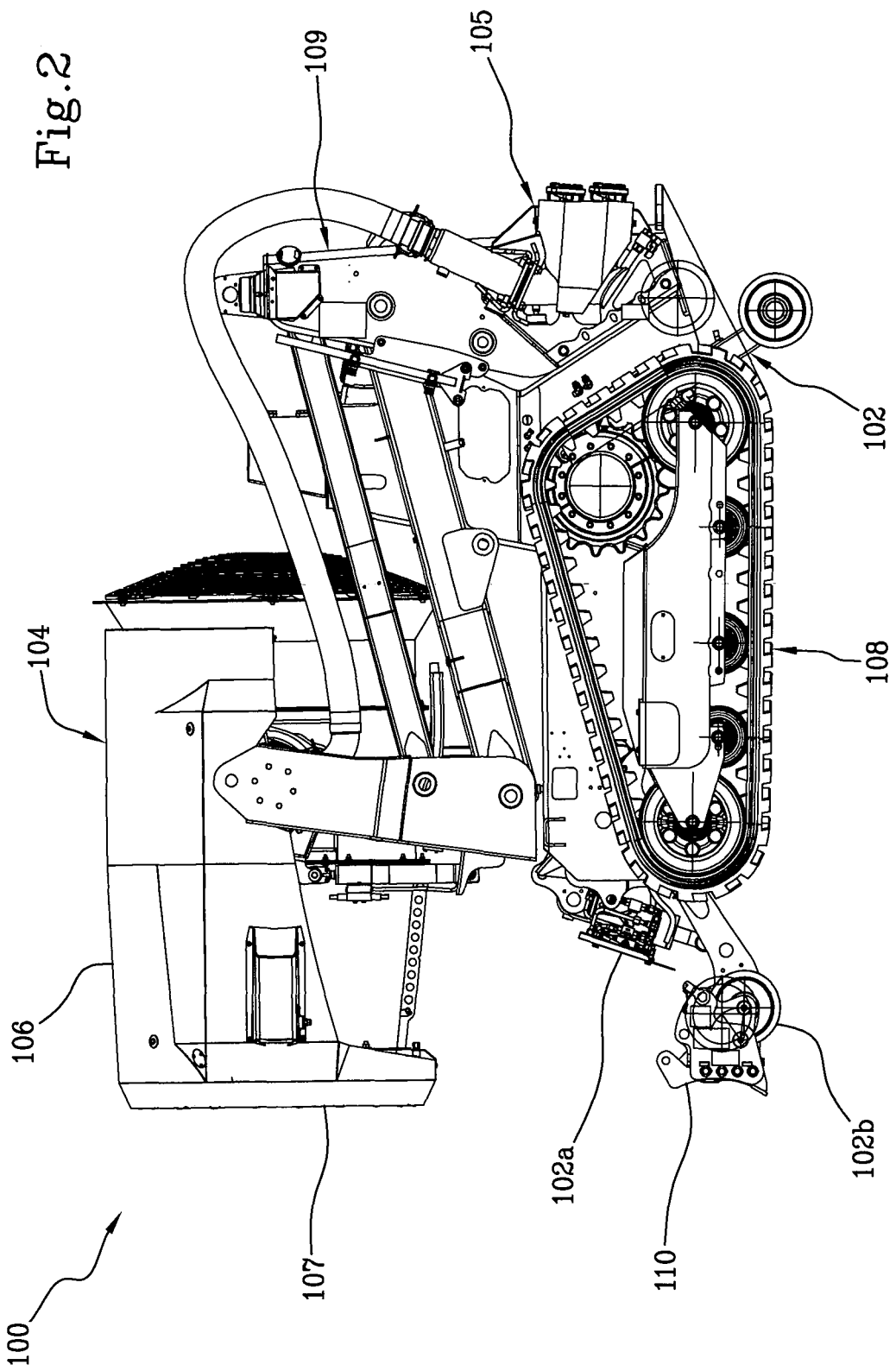
FIG. 2 is a side view of a fluid-jet emitting device according to the present invention.

According to a preferred embodiment shown in the attached FIGS. 1 and 2, the firefighting machine 100 comprises at the front, with respect to the direction of travel thereof, a clearing blade 110.

The term "clearing blade" 110 is understood as a preferably flat and at least vertically movable plate (or also with other degrees of movement in space) that performs the function of clearing any debris located along the route of the firefighting machine in such a manner as to prevent such debris from interfering with the movement thereof.

In accordance with this embodiment, the firefighting machine 100 comprises a pair of lifting members 102, made up of a first lifting member 102 and a second lifting member 102 that are reversibly constrained to a rear portion of the firefighting machine 100, and a third lifting member 102 comprising two idler wheels 102b, each of which is reversibly constrained to a respective lateral end of the clearing blade 110, and an actuator 102a that is reversibly constrained to the clearing blade 110 and configured to activate movement of the clearing blade 110 along a direction that is substantially perpendicular to the plane supporting the firefighting machine 100.

As an alternative to the clearing blade 110, the machine 100 can also comprise at the front other types of accessories, which are not expressly indicated here and that are capable of moving vertically or even with other degrees of movement in space.

A road/rail conversion kit also constitutes an object of the present invention and the schematic representation of a possible embodiment thereof appears in FIG. 3.

The kit 101 comprises a plurality of lifting members 102 and a control device 103.

Each lifting member 102, in turn, comprises an actuator 102a, which can be reversibly constrained to a vehicle, and at least one idler wheel 102b adapted to engage a rail of a track.

Each actuator is configured to move the at least one wheel 102b associated with it (102a) between a non-operative position and an operative position.

Preferably, each actuator 102a is connected at one end thereof to an idler wheel 102b. However, in the case in which the vehicle to which the kit 101 needs to be applied already has movable members along a direction that is prevalently vertical with respect to the plane supporting the vehicle, it is also possible to interpose these members between the actuator 102a and the wheel 102b, in such a manner that the action of the actuator 102a acts upon the movable member, which, in its lowering/lifting movement, also drags along with it the wheels 102b constrained to it.

In other words, it is possible to apply a plurality of wheels 102b to the same movable member of the vehicle to which the kit 101 is applied, then installing a single actuator 102a, which, by means of the movement of the movable member, passing from the non-operative position to the operative position, simultaneously moves all of the wheels 102b applied to the same movable member.

The actuator can for example be realized by means of a piston-telescopic body unit in which the action of the piston leads to an extension/retraction of the telescopic body.

The control device 103 is operatively associated with the actuators 102a to activate the passage of the wheels (102b) from the non-operative position to the operative position.

It should be noted that the control device 103 is preferably of the type that is remotely controllable by an operator, for example by means of a radio control. Alternatively, the control device 103 comprises control members arranged directly on the machine 100 to control the functions thereof.

For example, the control device can be realized by means of a control unit and a tank for a fluid in fluid communication with the actuator 102a of each lifting member 102.

By means of actuation of the control unit, it is possible to pump a given amount of fluid from the tank towards each actuator 102a, even independently, mediating the passage from the non-operative position to the operative position, or recalling that same amount of fluid, bringing the actuator 102a back to the non-operative position.

Advantageously, this control unit can be integrated in a control unit of the vehicle to which the kit 101 is applied so as to have a single control device that makes it possible to control both the vehicle and the kit 101.

According to a possible embodiment, which is not shown in the attached figures, the kit 101 of the present invention comprises two pairs of lifting members 102.

A first pair is configured to be constrained to a front portion of a vehicle, preferably on opposite sides thereof, spaced at a distance equal to that of the track gauge of the tracks on which the vehicle needs to be moved, in such a manner that each one engages a respective rail of the railway line. A second pair is configured to be constrained to a rear portion of a vehicle, preferably on opposite sides thereof, spaced at a distance equal to that of a track gauge in such a manner that each one engages a respective track of the railway line on which the vehicle to which the kit 101 is applied needs to be moved.

In particular, the kit 101 is configured to be applied when it is the non-operative position to a vehicle arranged along a rail and that has movement means in contact with the rail tracks, in such a manner that the lifting members 102 can be installed on the vehicle and simultaneously engage the rail.

Subsequently, by means of the activation of the control device, the passage of the lifting members 102 from the non-operative position to the operative position takes place, generating partial lifting of the vehicle.

In other words, when the lifting members 102 pass from the non-operative position to the operative position, they cause partial lifting of the vehicle on which the kit 101 has been installed, thus reducing the weight exerted by the movement means of the vehicle, which is instead released on the idler wheels 102b of the kit 101.

In this manner, the existing coupling between the wheels 102b and the railway line tracks is reinforced, thereby ensuring greater stability during movement of the vehicle.

However, it should be noted that the lifting movement of the vehicle is such as to reduce the pressure exerted by the vehicle on the railway line, without, however, causing its detachment, in such a manner as to guarantee contact of the means for transmitting traction with the tracks.

In fact, the kit 101 is not motorized, but it makes use of the normal movement mechanism of the vehicle on which it is installed to enable the movement thereof.

In other words, the kit 101 of the present invention is capable of carrying out a conversion of the vehicle on which it is installed, making it apt for moving also along a railway line, making use of the normal traction mechanism of the vehicle, thus resulting in a simple, easily transportable and quickly installable solution.

To enable installation of the kit 101 of the present invention, the kit 101 comprises reversible fastening means configured to reversibly connect each lifting member 102 to a respective portion of a vehicle.

These reversible fastening means can comprise, for example: screws, snap pins or bayonet couplings.

A method for road/rail conversion of a vehicle also constitutes an object of the present invention, said method comprising a step of arranging a fluid-jet emitting machine in accordance with the description provided hereinabove over a railway line.

Subsequently, one proceeds by actuating the control device 103 to activate the passage of the wheels 102b from the non-operative position to the operative position and generate, by means of the wheels 102b, a thrust such as to cause a partial reduction of the pressure exerted by the movement means 108 on the track, transferring this pressure onto the wheels 102b.

In the case in which the kit 101 is not already installed on the vehicle, or it is not an integral part of the vehicle, it is possible to carry out a retrofitting procedure that makes it possible to adapt a normal vehicle for rail transport by means of a step of installing a kit 101 on a vehicle arranged along a track, constraining the lifting members 102 to the vehicle and engaging the wheels 102b with the track.

Advantageously, the kit 101 for rail transport of vehicles according to the present invention makes it possible to modify any vehicle, machinery or other equipment to make it apt for moving even along a rail.

This conversion proves to be particularly simple and fast due to the simplicity of the application of the lifting members 102.

Advantageously, the firefighting machine 100 of the present invention is capable of moving on roads and along railway lines, using its normal traction mechanism, at the same time ensuring manoeuvrability of the vehicle and reducing to a minimum, and even eliminating, the risk of the vehicle veering off the road, owing to the partial lifting thereof, which makes it possible to ensure optimal adherence of the wheels 102b to the railway line.

The invention claimed is:

1. A fluid-jet emitting machine, comprising:
a fluid-jet emitting device configured to emit a fluid, said fluid comprising at least one of the following: an odour abatement solution, a dust abatement solution and/or a flame mitigation solution;
a transport vehicle comprising movement means, wherein the movement means is tired and configured to be arranged to rest on rails of a railway track, and
a support frame on which the fluid-jet emitting device is mounted;
a plurality of lifting members, each of which is connected to an actuator constrained to the transport vehicle, and idler wheels adapted to engage the rails of the railway track, said actuators being configured to move the respective idler wheels between a non-operative position, in which the idler wheels distanced from respective rails, and an operative position, in which the idler wheels are arranged in contact with the respective rails;
a control device that is operatively associated with the actuators to activate the passage of the idler wheels from the non-operative position to the operative position so that during movement along the railway track and in said operative position, the idler wheels are pressed against the respective rails, exerting a force such as to reduce only part of a pressure exerted by the movement means of the vehicle on the rails of the railway track for exerting only a partial lifting of the transport vehicle, so as to enable the movement means to have a residual tractive force on the rails of the railway track, said idler wheels, in the operative position, performing a function of guiding a trajectory of the machine on the rails of the railway track, wherein only the movement means are configured to move the transport vehicle when the transport vehicle is arranged on the rails of the railway track; and
a clearing blade, wherein at least two of the idler wheels are attached to the clearing blade.

2. The machine according to claim 1, wherein the pressure exerted by the movement means on the rails of railway track when the idler wheels are in the operative position, ranges between 40% and 50% of the pressure exerted by the movement means on the rails of the railway track when the idler wheels are in the non-operative position.

3. The machine according to claim 1, wherein the movement means are caterpillar tracks.

4. The machine according to claim 1, wherein the movement means have a wheelbase that is compatible with a track gauge and wherein said movement means have respective footprints arranged at a distance such that said footprints are arranged simultaneously in contact on respective rails of the railway track.

5. The machine according to claim 4, wherein said track gauge is equal to 1435 mm.

6. The machine according to claim 1, wherein each actuator is reversibly constrained to the transport vehicle.

7. The machine according to claim 1, wherein the machine is a firefighting machine, wherein the control device is operatively connected to a control unit of the firefighting machine.

8. The machine according to claim 1, comprising at a front, with respect to a direction of travel of the machine in use, the clearing blade that is at least vertically movable with respect to a plane supporting the machine.

9. The machine according to claim 8, comprising:
the plurality of lifting members including a pair of lifting members comprising a first actuator and a second actuator that are reversibly constrained to a rear portion of the firefighting machine and spaced at a distance equal to a track gauge, in such a manner that each one of the respective idler wheels engages a respective rail of the railway track;
the plurality of lifting members including a third lifting member comprising the two idler wheels, wherein each of the two idler wheels is reversibly constrained to a respective lateral end of the clearing blade, and an actuator that is reversibly constrained to the clearing blade and configured to activate movement of said clearing blade.

10. The machine according to claim 1, the plurality of lifting members comprising two pairs of lifting members, a first pair of lifting members being configured to be constrained to a front portion of the transport vehicle and spaced at a distance equal to a track gauge, in such a manner that each of the lifting members in the first pair of lifting members engages a respective rail of the railway tracks, and a second pair of lifting members being configured to be constrained to a rear portion of the transport vehicle and spaced at a distance equal to the track gauge in such a manner that each one engages a respective rail of the railway tracks.

11. The machine according to claim 1, wherein a difference between the track gauge length and a wheelbase of the movement means is greater than 0 cm and less than two times a lateral dimension of a single movement means of the transport vehicle, in such a way as to ensure that the movement means are always all simultaneously in contact with the rails.

12. The machine according claim 1, wherein said fluid-jet emitting device comprises a tubular body that extends between an air inlet mouth thereof and an air outlet mouth thereof, blowing means operatively associated with the tubular body to generate a flow of air along a direction of propagation of the air from the inlet mouth to the outlet mouth, and a plurality of nozzles operatively associated with the tubular body to spray a fluid towards the flow of the air.

13. A method for road/rail conversion of a machine according to claim 1, comprising the steps of:
arranging the fluid-jet emitting machine in accordance with claim 1 over the railway tracks;
actuating the control device to activate the passage of the idler wheels from the non-operative position to the operative position;
generating, by means of the idler wheels, a thrust such as to reduce only partially the pressure exerted by the transport vehicle on the rails of the railway track through the movement means for exerting only a partial lifting of the transport vehicle;
activating the movement means to move the machine along the railway tracks.

14. The machine according to claim 1, wherein the machine is a firefighting machine.

15. The machine according to claim 1, wherein the movement means comprises wheels.

16. The machine according to claim 1, wherein the idler wheels are not motorized.

* * * * *